United States Patent [19]

Weber

[11] 4,369,508

[45] Jan. 18, 1983

[54] SONAR HAVING SIGNAL AMPLITUDE DIFFERENTIATION AND NOISE SUPPRESSION

[75] Inventor: Ronald G. Weber, Tulsa, Okla.

[73] Assignee: Lowrance Electronics, Inc., Tulsa, Okla.

[21] Appl. No.: 207,937

[22] Filed: Nov. 18, 1980

Related U.S. Application Data

[63] Continuation of Ser. No. 969,726, Dec. 15, 1978, abandoned.

[51] Int. Cl.³ .................. G01S 15/96; G01S 7/66
[52] U.S. Cl. .................... 367/115; 367/97
[58] Field of Search .............. 367/87, 97, 99, 107, 367/115

[56] References Cited

U.S. PATENT DOCUMENTS

| | | | |
|---|---|---|---|
| 3,109,154 | 10/1963 | Grada et al. | 367/115 X |
| 3,332,056 | 7/1967 | Drenkelfort | 367/97 |
| 3,440,598 | 4/1969 | Drenkelfort et al. | 367/115 X |

Primary Examiner—Richard A. Farley
Attorney, Agent, or Firm—Head, Johnson & Stevenson

[57] ABSTRACT

Both signal amplitude presentation and noise suppression presentation of sonar signals have been known for some time, but have been incompatible in the same display system. In this disclosure, means are provided for separately processing the received signal in two parallel paths, one through a noise-pulse suppression processor, and the other through a signal amplitude differentiation processor which adds an additional adjustable time delay so that the signals processed through both paths are initiated at the same time and thus can be presented together.

8 Claims, 2 Drawing Figures

NSS – NORMAL SUPPRESSION SIGNAL
NADS – NORMAL AMPLITUDE DIFFERENTIATION SIGNAL
CADS – COMBINED AMPLITUDE DIFFERENTIATION WITH SUPPRESSION
BLD – BLACK LINE DELAY
TOD – TURN OFF DELAY
STD – SUPPRESSION TIME DELAY

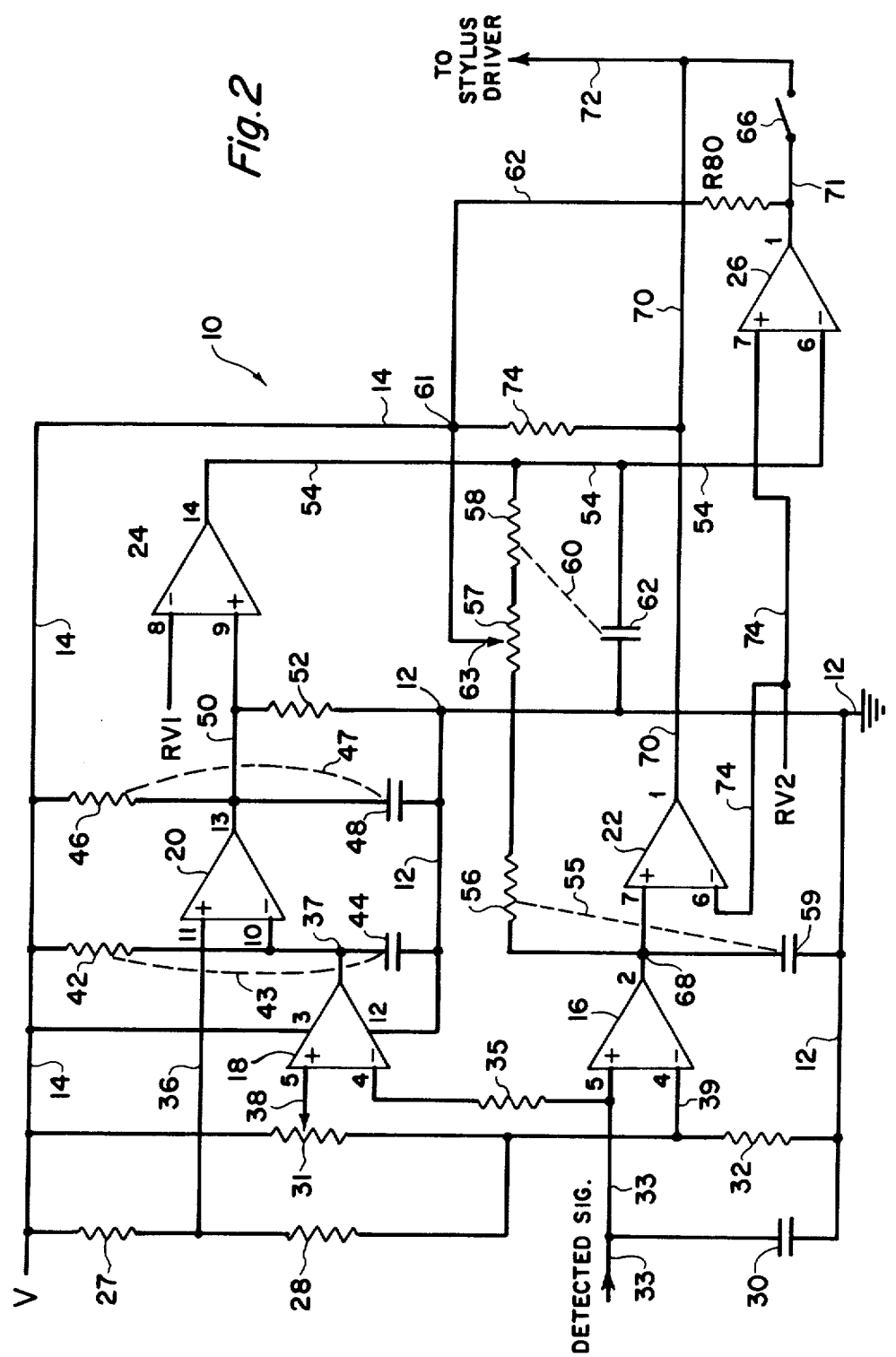

4,369,508

SONAR HAVING SIGNAL AMPLITUDE DIFFERENTIATION AND NOISE SUPPRESSION

This is a continuation application of Ser. No. 969,726, filed Dec. 15, 1978 and now abandoned.

BACKGROUND OF THE INVENTION

1. Field of the Invention

This application lies in the field of sonar instrumentation. More particularly, it is concerned with sonar apparatus which is utilized for shallow depth prospecting for fish. More particularly, it is concerned with the use of sonar apparatus in conjunction with a display-recorder, which may be of linear or curvilinear form.

2. Description of the Prior Art

The concept of noise suppression has been patented previously by Austin U.S. Pat. No. 3,747,053. There has been attempts to provide signal amplitude differentiation. Both concepts have been used separately in sonars for some time, but no one has been able to make them work together. The uniqueness of this invention is that it combines these two concepts, which are normally incompatible, into a new circuit which accomplishes both variable noise suppression and signal amplitude differentiation at the same time.

Variable noise suppression is a method of pulse width discrimination. The sonar tone burst transmission is normally of very short duration, approximately 200 usec. Unfortunately, there are other sources of sound energy in the same frequency range from sources other than the sonar. These signals when received by the sonar are called noise. Noise typically occurs as pulses of short duration. Therefore, if the pulse width of the transmitted tone burst is increased and an integrator is added to the receiver which requires the reception of a tone burst for a given length of time before it is accepted as a legitimate signal, the noise pulses of short duration will be lost. A potentiometer on a sonar called a suppression control determines the pulse width of the transmitted pulse and the integration time of the receiver. It is typically set only high enough to remove noise signals since the higher it is set, the lower the resolution of the sonar.

Signal amplitude differentiation has also been used. When a received signal in a sonar chart recorder goes above a predetermined amplitude, a signal differentiator causes the recording mechanism to inhibit printing or display of the signal. When the received signal falls below that threshold, printing or display of the signal resumes. The amplitude differentiator is delayed a short length of time so that the leading edge of the signal is always seen. What this results in is that the bottom of the body of water being charted appears as a thin black line after which is a white area. The bottom signal resumes printing after its level falls below a predetermined level. This function is useful for determining where the bottom is underneath structure which does not reflect as strong a signal as the bottom.

These two concepts have been incompatible with each other in the past. This is because the suppression circuit creates a delayed version of the original signal which causes the leading edge of the bottom signal, the "thin black line" to be lost when in the signal differentiation mode. Time delays are critical to both circuits and they work against each other.

SUMMARY OF THE INVENTION

It is a primary object of this invention to provide a sonar system which provides two independent types of processing of the received signal, which processing involves signal amplitude differentiation recording and noise pulse suppression.

These and other objects are realized and the limitations of the prior art are overcome in this invention by providing a signal processor in a conventional sonar transmitter equipment, which divides the detected signal into two parts, each of which is processed in a separate circuit, and the outputs of which are joined together, to a stylus driver amplifier. The signals are handled as analog signals, but with logic controlled switches, which can be of many kinds. A preferred embodiment involves the use of voltage comparators as switches, such that when an input voltage passes the level of a reference voltage, the output of the comparator changes abruptly from a logical zero to a logical one, or vice versa, depending on the direction of change of the input voltage.

The outputs of these switches, or comparators, are then delayed by RC networks for selective purposes. For example, the processing path that involves the noise pulse suppression involves a time delay of the detected signal of a selected adjustable amount, which is found to be longer than the lengths of the noise pulses which are being received. Thus, by delaying the application of the received signal to the stylus amplifier, or driver, for this selected time, the only signal that would still be present would be a valid echo signal, and the shorter timed noise pulses would have disappeared. Thus, the stylus will record a cleaner signal, dependent only on the present of a true echo signal. The specific time delay in that recorded signal is known and is provided as a correction on the reading of the record.

This part of the apparatus is similar to the circuit of U.S. Pat. No. 3,747,053, and reference is made to that patent for details of a typical overall sonar system, including initiation, amplification, and driving of a transducer and detecting a return echo reflection, amplifying that reflection to provide a detected signal, and then delaying that signal in the manner just described to minimize noise display.

Another path of processing of the received signal involves the signal amplitude differentiation. This involves providing a circuit which amplifies the detected signal, so that all signals above a certain amplitude will be printed on the record by the stylus. In addition, a second amplitude of signal is detected which is some selected magnitude larger than the first level, it being observed that the first level may be due to small reflecting objects such as fish, whereas a hard rock or mud bottom might reflect a much larger signal, and therefore, the detected signal amplitude would be much higher.

The object of this process is to distinguish between small echo signals and the large echo signals which, however, are both greater than a minimum amplitude that should be printed. However, since some of the display devices available only provide one density of printing, there is no way of distinguishing between the moderate and the large amplitudes of signal. When such large amplitudes are received, the signal is printed by the stylus for a selected short time, and then the signal is disabled. What is recorded is a short black spot and no line thereafter for a second selected period—then whatever signal is available is again recorded. The idea of the disabling of the recording process is to provide a thin black line which represents the contour of the hard reflecting surface, that is, the surface which provides the high amplitude of signal, and terminating the recording of that amplitude signal after a certain length of line is recorded. Now, since the leading edge of the high amplitude signal can be preceded by low level signals due to fish or other small reflecting objects close to the bottom, the position of the bottom is determined not from the leading edge of the low level signal but from the trailing edge of the black line.

This process involves detecting and recording the high amplitude part of the signal, and after a selected short constant interval of delay, disabling the stylus for a selected long period of time.

These two simple descriptions of the noise suppresion process and the amplitude differentiation recording process indicate that they are incompatible, because the noise suppression circuit necessarily involves delaying the initial recording of an echo until enough time has passed so that any noise pulses that might have tripped the detecting circuit will have terminated, and any long period signal, such as a true reflection from a hard surface at the base of the water, would still be present and would then be recorded as a reflection off the bottom. Because known amplitude differentiation circuits must act on the leading edge of the detected signal and because known pulse width discriminating suppression circuits operate by delaying acting upon a delayed signal, the thin black line representing the contour of the hard reflecting surface (i.e. bottom of body of water) is lost.

In this invention, two separate parallel processes of the received signal are carried out—one of which is more or less conventional noise pulse suppression recording, and the other is the amplitude differentiation recording. The modified amplitude differentiation process consists of first acting immediately upon the detected signal and then delaying the results of this action for a time equal to the suppression integration time. The results of these two processes are then added together and then overcome their basic incompatibility.

BRIEF DESCRIPTION OF THE DRAWINGS

These and other objects and advantages of this invention and a better understanding of the principles and details of the invention will be evident from the following description taken in conjunction with the appended drawings in which:

FIG. 2 illustrates a portion of a sonar system which illustrates the processing of the detected signal through two paths in order to provide a display according to that shown in FIG. 1.

DESCRIPTION OF THE PREFERRED EMBODIMENT

Figure 1:
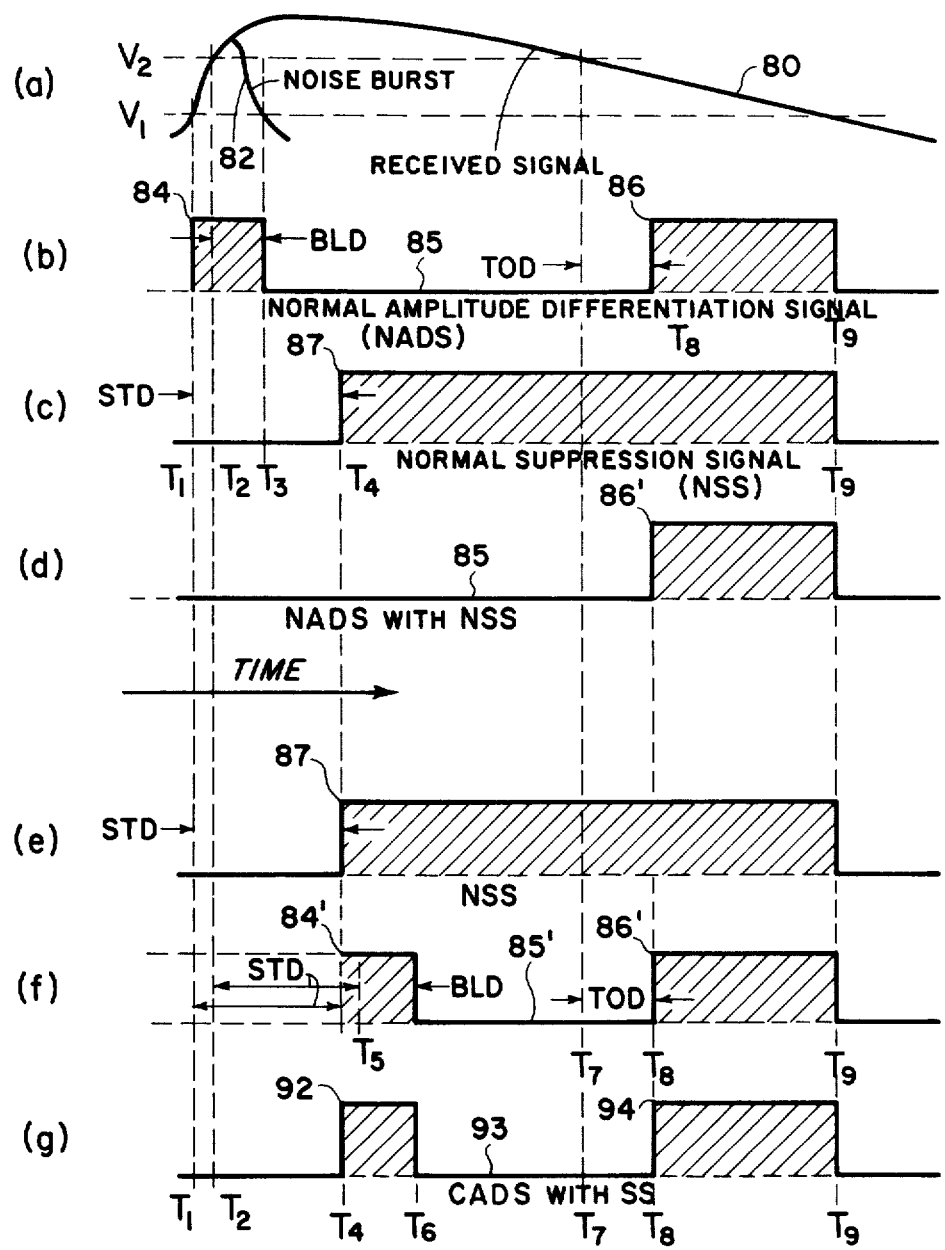
FIG. 1 illustrates the nature of a received noise burst and a received echo signal, and the type of wave form of signal sent to the stylus driver in accordance with the conventional noise suppression processing, the normal amplitude differentiation processing, and the combined modified amplitude differentiation processing and noise suppression processing.

Referring now to FIG. 1, there are a group of seven graphs, showing the amplitudes of various types of signals as a function of time. Row A illustrates by the numeral 80 a typical detected echo signal, called received signal, which starts at the left end, at an amplitude less than V1, which represents the amplitude of signal which will just barely record on the display device. If the signal rises to a higher amplitude equal to or greater than V2, the amplitude of signal is defined as a strong echo, which should be identified as such on the display.

Shown also overlapping the rise portion of the received signal is a hypothetical noise burst 82 which itself rises above the amplitude V2 which if the curve 82 were a true signal would be identified again as a bottom echo. Other noise pulses may be below V2 but above V1. Experience has shown that noise bursts are of short time duration, and after a short interval of time, say from T2 to T3, decays to a value below which no further marking on the display chart would be possible. Described in the U.S. Pat. No. 3,747,053, which is entered into this application by reference, is the novel method of distinguishing between a received signal similar to curve 80 and a noise burst similar to the curve 82.

The process by which the relative detection takes place and the separation of noise from signal is shown in curve (c). As soon as the beginning signal rises to a value of V1 at a time T1, an adjustable delay comes into effect in the signal processing circuit, which delays further action for a selected period of time from T1 to T4. The magnitude of this time delay is adjustable. The reason for this is that if there is no appreciable noise, then the delay can be reduced, which provides for better resolution of closely spaced echo signals. However, if there are a lot of noise bursts, each one of which can trip the detector and cause the chart to display a line, the delay interval, called the suppression time delay, STD, shown by the arrows between T1 and T4 is lengthened, until there is no signal, or conversely, it is a true bottom signal, or echo signal, that is being received. The signal will rise to full amplitude 87 at the end of the suppression time delay. Thereafter, a full presentation of black line is made corresponding to the curve 87 between time T4 and T9. Again, curve (c) represents the standard suppression signal system of U.S. Pat. No. 3,747,053.

Now, going to trace (b) there is an indication of the normal amplitude differentiation processing. In this system, as soon as the signal rises to an amplitude V1, a signal 84 is sent to the stylus to start recording, and this continues. The signal rises to V2, then, after a selected time delay, identified by BLD, the black line delay, a signal is generated to disable the stylus driver amplifier, and the signal that was on the stylus drops to zero and follows trace 85 for a selected period of time. Then the disabling voltage is removed at time T8, and the trace rises to amplitude 86 until it is turned off at the end of the received signal 80 at T9. The curve 84, 85, 86 of trace (b) is a typical normal amplitude differentiation trace.

Now, consider what would happen if the signal processing involved first passing the received signal to the amplitude differentiation processing portion (trace (b)), and then to the suppression signal processing (trace (c)). The result is shown in trace (d) where it is clear that the trace is dead in accordance with 85 up to the time T8, and then rises to the amplitude 86' as in trace (b). Consequently, since the very important information of the amplitude differentiation record 84 comes during a time that the suppression signal disables the stylus amplifier, that important information is lost. Thus, it appears to be incompatible to directly combine an amplitude differentiation type of recording with a suppressed noise signal recording.

Referring now to trace (e), there is shown again a repetition of trace (c) which is the suppression signal that is normally provided in accordance with U.S. Pat. No. 3,747,053. In trace (f), a modification of the amplitude differentiation processing system, shown in (b), is shown, which provides for delaying the whole trace of the amplitude differentiation signal processor by such an amount that the leading edge 84 at T1 has been moved back to 84' at T4. Trace (f) shows the standard signal of the amplitude differentiation as shown in (b), the leading edge of which has been arbitrarily delayed such that the leading edge 84 now is shown as 84', which occurs at time T4, which is the same as the time of start of the delayed suppression signal. Thus, by applying the suppression time delay from time T1 to time T4, then adding the black line delay, which is a normal part of the amplitude differentiation processor, this processor then disables the stylus amplifier. In spite of the fact that the suppressed signal would be showing during the period 85', the trace becomes dead until time T8 where it would normally be regenerated to display the portion beginning at 86'.

Finally, in trace (g) is shown the recording of a combination amplitude differentiation processor with noise suppression recording, which is the same as trace (f) which starts at a selected suppression time delay time after the signal approaches amplitude V1 and goes to zero at a time equal to the black line delay after the signal reaches V2. It then remains dead for a period from T6 to T8 according to trace 93, and then at T8 it rises again to full amplitude at 94 and continues to the cut-off time at T9.

This type of amplitude differentiation processing with noise suppression recording is not the same as the standard recording, which has been specifically designed to start the stylus record at the time T1 when the amplitude of the signal applied to the recorder equals V1. In this combination record, the suppression noise processor determines the time T4 of the origination of the black line at a selected variable time after the signal reaches V2, while the amplitude differentiation recording portion determines the time of cut-off T6, which begins the amplitude differentiation portion of the trace, and then time T8 is determined from the time T7 where the signal again drops to value V2, plus a turnoff delay between T7 and T8.

FIG. 1 illustrates what is done to the signal in the processing. Referring now to FIG. 2, there is shown a portion of the sonar that provides this type of signal processing.

Shown in FIG. 2, indicated generally by the numeral 10, is a circuit for combining the amplitude differentiation recording and the noise suppression recording. A standard power voltage V is applied to line 14, and line 12 is grounded. Input line 33 carries the detected signal from the echo signal amplifier, which amplifies and filters the received signal. At the output of the signal amplifier, an envelope trace is provided on line 33 which is similar to the trace 80 of FIG. 1(a). This input signal goes to a first voltage comparator means 16 by a lead 33, to the plus terminal 5. The minus terminal is set at a selected voltage by lead 39, which taps off a fraction of the voltage V determined by resistors 31 and 32.

Normally the plus terminal of comparator 16 is low when there is no echo signal. When terminal 5 is low, the output terminal at 68 is grounded and the capacitor 59 is discharged, and remains discharged. When an echo signal is received on line 33, terminal 5 goes high and the output at 68 opens. In this situation, the capacitor 59 begins to charge through the series resistor 56 from a source of voltage on line 14 at junction 61, through slider 63 on the potentiometer 57, so that the voltage on 68 rises on an exponential curve, until it becomes higher than the reference voltage which is on the terminal 6 of a second comparator means 22.

This reference voltage RV2 is applied to the line 74 which serves the comparator 22, and also a comparator 26 which will be described presently. Thus, when the rising voltage at 68 becomes higher than the reference voltage on the negative terminal 6 of comparator 22, the output line 70 becomes high, and through leads 70 and 72 going to the stylus amplifier, causes a black line to be drawn on the chart. The delay which is introduced by the integrator 55 comprising resistor 56 and capacitor 59, is the delay shown in FIG. 1(c) as the STD or suppression time delay. In the absence of an amplitude differentiation processor, the type of trace recorded based on the signals supplied on lines 70 and 72 would be that shown on trace (c) of FIG. 1.

Capacitor 59 is the normal suppression capacitor and with resistor 56 comprises an integrating or delay circuit 55. How long it must integrate, or how high the voltage must rise before it causes the signal to be accepted and thus control and mark the display paper, is determined by the reference voltage on the negative input 6 of second comparator 22. This reference voltage is set by the suppression control. When the reference voltage increases, this requires the signal to integrate for a longer period of time before the voltage is high enough to trigger the comparator 22 and cause its output on line 70 to go positive, turning on the stylus driver, causing the stylus to record black. If there is no amplitude differentiation recording involve (that is, switch 66 is open), this is all that is required to turn on the stylus driver and create a black line, which would start at a time T4 and continue until turn-off at T9.

In this improved circuit, an amplitude differntiation processor is provided which starts at a comparator 18, which has an input from the same input line 33 of the detected signal, through resistor 35. The amplitude differentiation processor processes this signal, and its output, line 71, combines with the normal output through switch 66 (when closed) in such a way that it can inhibit the signal to the stylus driver, line 72. This combination of the output of a comparator 26 in combination with the comparator 22 is such that when both outputs are high, the signal on the lead 72 to the stylus driver will be high, and the stylus will print. When either of the outputs of 22 or 26 is low, the output on line 72 will be low. Thus, each of the final comparators of the suppression circuit comparator 22 and amplitude differentiation comparator 26 can control the printing of the stylus. When either one is low, the trace is inhibited; and when both are high, the trace is drawn.

Returning now to the third comparator 18, whenever the signal on the minus input of comparator 18 at terminal 4 rises above the reference voltage set by the white line control 38 on potentiometer 31 at terminal 5, its output is grounded at terminal 37. The capacitor 44 is immediately discharged until the signal at terminal 4 of comparator 18 falls back below the threshold. When this occurs, the output of comparator 18 (terminal 37) opens, and the signal on line 37 starts to rise from ground to the supply voltage at a rate determined by the integrator 43 including resistor 42 and capacitor 44, which delays the triggering of the fourth comparator 20. This serves to keep the amplitude differentiation functioning when the input signal momentarily falls below the threshold, for a short period of time. That is, if the input signal should fall below amplitude V2 of FIG. 1, the delay circuit capacitor 44 will maintain a signal giving a cleaner record on the graph.

Fourth comparator 20 inverts the signal again and the leading edge of its output pulse is delayed by third integrator 47, which is a combination of resistor 46 and capacitor 48. This delay controls the start of the amplitude differentiation function enough to allow a fine black line to precede it. This is what was called black line delay in trace (b) of FIG. 1.

This signal output on capacitor 48 goes through lead 50 and triggers fifth comparator 24 at a level set by the reference voltage on terminal 8, and the output goes to the amplitude differentiation suppression integrating circuit 60 comprised of capacitor 62 and resistor 58. The dashed line 60 between them indicates that they serve as an integrator and time delay device. The delayed signal on lead 54 triggers the sixth comparator 26 at a level determined by the setting of the suppression control or reference voltage at terminal 7 in accordance with RV2 on lead 74.

A time delay is created by 60, and this delay matches that of the signal through the normal suppression circuit, through comparators 16 and 22. Since timing is very critical, a trim potentiometer 57 is provided to adjust the relative time delays of the two circuits 55 and 60. One delay 55 is provided by resistor 56 and capacitor 59, and the other delay 60 is caused by resistor 58 and capacitor 62. Sliding the contact 63 to one end or the other of the potentiometer 57 adds resistance into one delay unit and takes it out of the other, or vice versa, and thus it is possible to shorten one delay and increase the other delay, or vice versa, so that the two delays are exactly the same length as shown in trace (f) of FIG. 1.

As previously mentioned, the output of the sixth comparator 26 goes through switch 66 to the lines 70 and 72, to the stylus driver amplifier, so that the two outputs of the comparator 22 on line 70, providing the processed noise suppression control, and on line 71 and switch 66 and line 72 of the amplitude differentiation processing circuit, together control stylus printing. When one or the other is low, the recording of the stylus is interrupted; and when both are high, the stylus records. Comparison of traces (e), (f), and (g) of FIG. 1 will clearly indicate this process.

No detail has been shown for the transmitter, transducer, receiver, and black line recorder since these are fully described in the Patent 3,747,053 which has been made part of this application, and the subject is generally well-known in the art.

What has been described is a novel sonar receiver and display processor, which provides a combination of the well-known noise suppression circuits and a modification which may be called an amplitude differentiation processor, so that the benefits of both types of processing of sonar signals can be achieved in the same instrument.

While the invention has been described with a certain degree of particularity, it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What is claimed is:

1. In a sonar system having a display means, including means to initiate a transmitted ultrasonic pulse in a body of water, and including echo signal sensor means, amplifier means and signal detector means, the improvement in means to process the detected signal to provide both recognition of differences in amplitudes of the detected signal and noise suppression, comprising:
   (a) first comparator means responsive to said detected signal, and a first integrator means responsive to the output of said first comparator means;
   (b) second comparator means responsive to said first integrator means, the output of said second comparator means connected to the input of a stylus driver means;
   (c) third comparator means responsive to said detected signal, and second integrator means responsive to the output of said third comparator means;
   (d) fourth comparator means responsive to the output of said second integrator means, and third integrator means responsive to the output of said fourth comparator means;
   (e) fifth comparator means responsive to the output of said third integrator means, and a fourth integrator means responsive to the output of said fifth comparator means;
   (f) sixth comparator means responsive to said fourth integrator means, the output of said sixth comparator means connected to the output of said second comparator means, and to the input of said stylus driver means;
   whereby whenever one of the outputs of said second and sixth comparators drops to a zero signal, the display means is disabled and when both outputs are high signals, said display means is enabled.

2. The apparatus as in claim 1 including means to relatively adjust the delays of said first and fourth integrator means.

3. In a sonar system for locating fish, other submerged objects, and indicating the depth of the bottom of a body of water, a method of providing improved signals to a display means comprising:
   initiating a time spaced sequence of echo producing ultrasonic pulses in the body of water;
   sensing echo signals;
   producing a noise suppression signal in response to sensed echo signals;
   producing a separate amplitude signal in response to the sensed echo signals;
   delaying said amplitude signal until it has the same time delay as said noise suppression signal; and
   combining the noise suppression signal and amplitude signal to drive the display means; and
   wherein said step of producing said suppression signal comprises the steps of;
   comparing in a first comparator means the sensed signals;
   integrating in a first integrator means the output of said first comparator means;
   comparing in a second comparator means the output of said first integrator means; and driving said display means by the output of said second comparator means.

4. In a sonar system having a display means, means to initiate an ultrasonic pulse in a body of water and an echo signal sensor, the improvement in means to process the detected echo signal to provide amplitude differentiation recording with noise suppression, comprising:
- means responsive to the detected signal to provide a noise suppression signal;
- means responsive to said detected signal to provide an amplitude differentiation signal;
- means to delay said amplitude differentiation signal until it has the same time delay as said noise suppression signal; and
- means to combine said noise suppression signal and said amplitude differentiation signal to drive the display means.

5. A sonar system according to claim 4 in which the display means includes a moving stylus and wherein said amplitude and suppression signals are combined to enable and disable said stylus.

6. A sonar system according to claim 5 in which said means to provide said suppression signal comprises;
- a first comparator means responsive to said detected signal;
- a first integrator means responsive to the output of said first comparator means;
- a second comparator means responsive to said first integrator means, the output of said second comparator means being connected to the input of means to drive said stylus.

7. The apparatus as in claim 6 in which said means to provide said amplitude signal comprises;
- third comparator means responsive to said detected signal;
- a second integrator means responsive to the output of said third comparator means;
- fourth comparator means responsive to the output of said second integrator means;
- third integrator means responsive to the output of said fourth comparator means;
- fifth comparator means responsive to the output of said third integrator means;
- fourth integrator means responsive to the output of said fifth comparator means;
- sixth comparator means responsive to said fourth integrator means, the output of said sixth comparator means connected to the input of means to drive said stylus.

8. In a sonar system for locating fish and other submerged objects and indicating the depth of the bottom of a body of water, a method of providing improved signals to a display means comprising:
- initiating a time spaced sequence of echo producing ultrasonic pulses in the body of water;
- sensing echo signals;
- producing a delayed noise suppression signal in response to sensed echo signals;
- producing a separate amplitude differentiation signal in response to the sensed echo signals;
- delaying said amplitude differentiation signal an amount of time equal to the delay of said noise suppression signal; and
- combining the noise suppression and amplitude differentiation signals to drive the display means.

* * * * *